US008352421B2

(12) United States Patent
Little (10) Patent No.: US 8,352,421 B2
(45) Date of Patent: Jan. 8, 2013

(54) RECORDING DISTRIBUTED TRANSACTIONS USING PROBABALISTIC DATA STRUCTURES

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 524 days.

(21) Appl. No.: 12/128,577

(22) Filed: May 28, 2008

(65) Prior Publication Data

US 2009/0300022 A1 Dec. 3, 2009

(51) Int. Cl.
*G06F 7/00* (2006.01)
*G06F 17/00* (2006.01)
(52) U.S. Cl. .................. 707/609; 707/689
(58) Field of Classification Search .................. None
See application file for complete search history.

(56) References Cited

U.S. PATENT DOCUMENTS

| 5,335,343 | A | * | 8/1994 | Lampson et al. ............... 714/19 |
| 5,428,771 | A | * | 6/1995 | Daniels et al. ............... 718/101 |
| 5,680,610 | A | | 10/1997 | Smith et al. |
| 5,884,327 | A | * | 3/1999 | Cotner et al. .................. 1/1 |
| 5,896,503 | A | | 4/1999 | Badovinatz et al. |
| 6,012,094 | A | | 1/2000 | Leymann et al. |
| 6,052,695 | A | | 4/2000 | Abe et al. |
| 6,266,698 | B1 | * | 7/2001 | Klein et al. ................... 709/227 |
| 6,401,120 | B1 | * | 6/2002 | Gamache et al. ............. 709/226 |
| 6,738,971 | B2 | | 5/2004 | Chandrasekaran et al. |
| 6,785,696 | B2 | | 8/2004 | Mosher et al. |
| 7,152,181 | B2 | | 12/2006 | Fung et al. |
| 7,206,805 | B1 | * | 4/2007 | McLaughlin, Jr. ............ 709/203 |
| 7,536,581 | B2 | | 5/2009 | Fisk |
| 7,620,842 | B2 | | 11/2009 | Fung et al. |
| 7,685,365 | B2 | * | 3/2010 | Rajwar et al. ................. 711/118 |
| 7,725,432 | B2 | * | 5/2010 | Barnes et al. ................. 707/611 |
| 7,778,972 | B1 | * | 8/2010 | Cormie et al. ................ 707/626 |
| 7,861,237 | B2 | * | 12/2010 | Tarditi et al. ................. 717/151 |
| 2005/0219929 | A1 | * | 10/2005 | Navas ........................... 365/212 |
| 2006/0095524 | A1 | * | 5/2006 | Kay et al. ...................... 709/206 |
| 2006/0174224 | A1 | * | 8/2006 | Parkinson et al. ............ 717/120 |
| 2007/0239943 | A1 | * | 10/2007 | Dice et al. ..................... 711/147 |
| 2007/0288387 | A1 | * | 12/2007 | Park et al. ....................... 705/59 |
| 2008/0256094 | A1 | * | 10/2008 | Gupta et al. .................. 707/100 |
| 2009/0183159 | A1 | * | 7/2009 | Michael et al. ............... 718/101 |
| 2010/0174731 | A1 | * | 7/2010 | Vermeulen et al. ........... 707/758 |

OTHER PUBLICATIONS

Abdallah, M., et al., "One-phase commit: does it make sense?", Parallel and Distributed Systems, 1998, Proceedings, 1998 International Conference, Dec. 14-16, 1998 pp. 182-192.
Broder, Andrei and Mitzenmacher, Michael, "Network Applications of Bloom Filters: A Survey", Internet Mathematics vol. 1, No. 4: 485-509.
"JBoss Transactions 4.2.3, JTS Programmers Guide", © 2006, 117 pages.
Johnson, Rod, et al., "Spring java/j2ee Application Framework, The Spring Framework—Reference Documentation", Version 2.5.6, © 2004-2008, 590 pages.

(Continued)

*Primary Examiner* — Wilson Lee
*Assistant Examiner* — Jessica N Le
(74) *Attorney, Agent, or Firm* — Lowenstein Sandler PC (57) ABSTRACT

A coordinator manages a two-phase commit distributed transaction. The coordinator uses a probabilistic data structure to record whether the two-phase commit distributed transaction was successfully completed. A participant of the two-phase commit distributed transaction is directed to commit to the transaction or to roll back the transaction based on contents of the probabilistic data structure.

12 Claims, 5 Drawing Sheets

OTHER PUBLICATIONS

King, Erik, "Perpetual Enterprise Management Service (PEMS) for C2 SOA Deployments", 10th International Command and Control Research and Technology Symposium, Jun. 14, 2005, pp. 1-23, Virginia.

King, Erik, "Perpetual Enterprise Management Service (PEMS) for Next Generation SOA-based Command & Control Systems", Science Applications International Corporation (SAIC), Mar. 28, 2005, 26 pages, Virginia.

Lampson, Butler and Lomet, David, "A New Presumed Commit Optimization for Two Phase Commit", Cambridge Research Laboratory, Technical Report Series, Feb. 10, 1993, 26 pages.

Samaras, George, et al., "Two-Phase Commit Optimizations and Tradeoffs in the Commercial Environment", IBM Distributed Systems Architecture, IBM Almaden Research Center, pp. 520-529.

Stern, Ulrich and Dill, David L., "A New Scheme for Memory-Efficient Probabilistic Verification", Stanford University Department of Computer Science, Stanford, California, 16 pages.

Abdallah, Maha, et al., "One-Phase Commit: Does it Make Sense?", Lab. PRiSM, Univ. de Versailles, 11 pages, Dec. 14-16, 1998 ISBN 0818686030.

Broder, Andrei, et al. "Network Applications of Bloom Filters: A Survey", Copyright A.K. Peters, Ltd. 1542-795/04, Internet Mathematics vol. I, No. 4, pp. 485-509.

Lampson, Butler, et al. "A New Presumed Commit Optimization for Two Phase Commit", Feb. 10, 1993, CRL 93/1, Digital Equipment Corporation, Cambridge Research Laboratory Technical Report Series. Copyright Digital Equipment Corporation 1993, 26 pages.

Samaras, George, et al., "Two-Phase Commit Optimization and Tradeoffs in the Commercial Environment", 1063-6382/93, Copyright 1993 IEEE, pp. 520-529.

Stern, Ulrich, et al., "A New Scheme for Memory-Efficient Probabilistic Verification", Stanford University Department of Computer Science, Stanford CA, 16 pages.

JBoss Transactions 4.2.3, Failure Recovery Guide Apr. 4, 2007, 33 pages JBoss Inc.

Little, M.C., et al., "Using Bloom Filters to Speed-Up Name Lookup in Distributed Systems" Apr. 11, 2002, 13 pages, Department of Computing Science, University of Newcastle, United Kingdom.

Liu, et al., "The Performance of Two-phase Commit Protocols in the Presence of Site Failures", In Proceedings of the 24th International Symposium on Fault-Tolerant Comptuing, 1994.

IONA Technologies PLC, "OrbixOTS Programmer's and Administrator's Guide," Sep. 2000, 312 pages.

* cited by examiner

RECORDING DISTRIBUTED TRANSACTIONS USING PROBABALISTIC DATA STRUCTURES

TECHNICAL FIELD

Embodiments of the present invention relate to distributed transactions, and more specifically to improving reliability of distributed transactions.

BACKGROUND

Distributed transactions are often performed on distributed computing systems. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator node (a node in the distributed computing system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

To accurately track distributed transactions, participants and coordinators log the distributed transactions. However, the number of distributed transactions that a coordinator or participant may participate in can be very high. Therefore, even though each log entry may not require a large amount of storage space, in the aggregate the logs can require enormous amounts of storage capacity. Therefore, once a distributed transaction is successfully completed, the log pertaining to the distributed transaction is typically deleted.

The two-phase commit protocol, although widely used, introduces substantial delay in transaction processing. This is because writing each log entry, in addition to consuming storage capacity, also consumes other resources (e.g., processor time, memory, network bandwidth, etc.). The basic two-phase commit protocol (often referred to as presumed nothing optimization) requires information to be explicitly exchanged and logged whether the transaction is to be committed or aborted (rolled back). Writing each entry to the log introduces overhead. Therefore, for a system that conducts many distributed transactions the presumed nothing optimization is undesirable. This applies even if logs for successful transactions are deleted.

Accordingly, a number of optimizations may be used to reduce the number of entries written to the log. A first optimization that may be used with the two-phase commit distributed transaction is the presumed abort optimization, which is implemented in almost all distributed transactional systems. According to the presumed abort optimization the coordinator only writes to the log when it decides to commit (to issue a command to all participants to commit). If there is a failure, or the coordinator decides to roll back, it never writes to the log. Therefore, in the absence of information about a transaction, the coordinator presumes that the transaction has been aborted. Another optimization is the presumed commit optimization. According to the presumed commit optimization, in the absence of information about a transaction the coordinator presumes that the transaction was successfully completed.

In the presumed commit, presumed abort and presumed nothing optimizations, there is a small window of vulnerability between the time when a participant agrees to commit to a message and the time when the participant receives a response indicating whether the participant should roll back or commit to the transaction. If the participant crashes within this window, then there will be no record of whether or not the transaction was successfully completed (because the coordinator deletes its log upon completion of a transaction). Therefore, if the presumed abort optimization is used, the participant will be informed that the transaction was rolled back (even if the transaction was successfully completed). If the presumed commit optimization is used, the participant will be informed that the transaction was successfully completed (even if the transaction was rolled back). If the presumed nothing optimization is used, the participant will be informed that it is unknown what the status of the transaction is.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for performing distributed transactions. In one embodiment, a coordinator manages a two-phase commit distributed transaction. The coordinator uses a probabilistic data structure to record whether the two-phase commit distributed transaction was successfully completed. The probabilistic data structure may be a probabilistic hash table (e.g., a hash table using cuckoo hashing or bitstate hashing and hash compaction), a bloom filter, etc. A participant of the two-phase commit distributed transaction can then be directed to commit to the transaction or to roll back the transaction based on contents of the probabilistic data structure.

In one embodiment, an entry for the two-phase commit distributed transaction is added to the probabilistic data structure if all participants of the distributed transaction commit to the transaction. A query may then be received asking whether the two-phase commit distributed transaction was successfully completed. If an entry for the two-phase commit distributed transaction is in the probabilistic data structure, the coordinator can answer with less than 100% accuracy that the transaction was successfully completed. If an entry for the two-phase commit distributed transaction is not in the probabilistic data structure, the coordinator can answer with 100% accuracy that the transaction was aborted (rolled back). In one embodiment, an auxiliary data structure is also used to record whether the two-phase commit distributed transaction is successfully completed. The auxiliary data structure may be a standard hash table or other non-probabilistic data structure.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "managing", "using", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
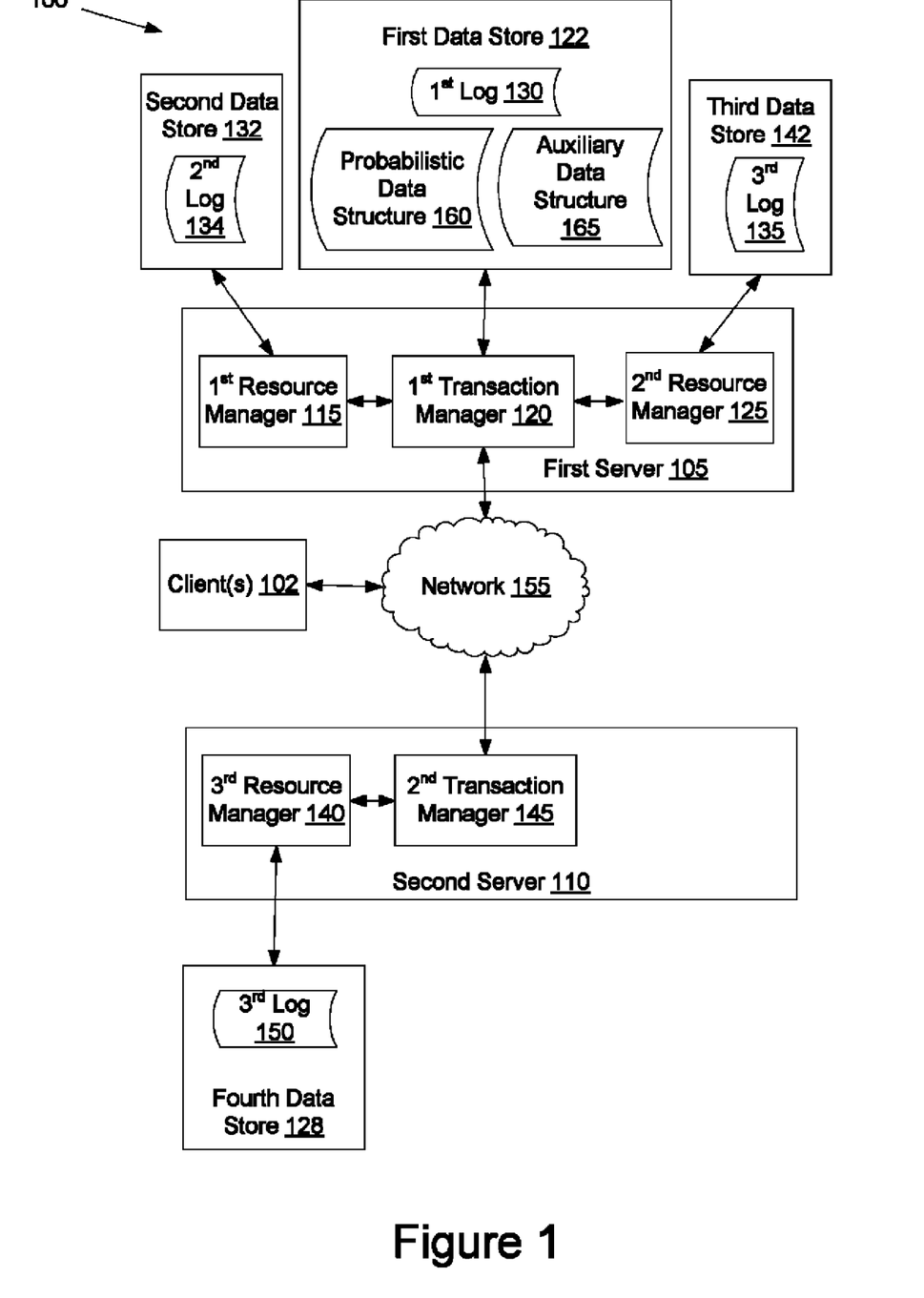
FIG. 1 illustrates an exemplary distributed computing system, in which embodiments of the present invention may operate.

FIG. 1 illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed computing system 100 includes one or more clients 102, a first server 105 and a second server 110 connected via a network 155. Alternatively, the distributed computing system may only include a single server and/or the client 102 may be directly connected with the first server 105 or the second server 110.

Client(s) 102 may be, for example, personal computers (PC), palm-sized computing devices, personal digital assistants (PDA), etc. Client(s) 102 may also be applications run on a PC, server, database, etc. In the SOA, client(s) 102 include applications that access services. Client(s) 102 may be fat clients (client that performs local processing and data storage), thin clients (client that performs minimal or no local processing and minimal to no data storage), and/or hybrid clients (client that performs local processing but little to no data storage).

Each of the first server 105 and second server 110 may host services, applications and/or other functionality that is available to clients 102 on the distributed computing system 100. The first server 105 and second server 110 may be a single machine, or may include multiple interconnected machines (e.g., machines configured in a cluster). The network 155 may be a private network (e.g., local area network (LAN), wide area network (WAN), intranet, etc.), a public network (e.g., the Internet), or a combination thereof.

In one embodiment, the first server 105 includes a first transaction manager 120, a first resource manager 115 and a second resource manager 125. A transaction manager is a software module that coordinates multiple participants during a distributed transaction. A participant may be another transaction manager (e.g., second transaction manager 145) or a local resource manager (e.g., first resource manager 115 and second resource manager 125). Coordinating a distributed transaction may include assigning identifiers to the transaction, monitoring progress of the transaction, taking responsibility for transaction completion, and providing fault recovery for the transaction. Taking responsibility for transaction completion may include determining whether each participant can commit to a transaction, directing each participant to commit if all are able, and directing each participant to rollback if not all participating nodes are able to commit. Providing fault recovery may include maintaining a log of transactions that can be used by participants to recover from a system failure.

Any transaction manager in the distributed computing system 100 is capable of operating as a coordinator node. Generally, it is a transaction manager that is located at a node at which a transaction is begun or requested that operates as the coordinator node for that distributed transaction. However, it is not a requirement that a node that begins a transaction act as coordinator node for that transaction. Moreover, a transaction manager can hand responsibility over to another node, causing a transaction manager of that other node to become the coordinator node.

In one embodiment, first transaction manager 120 acts as a master coordinator node, and coordinates a distributed transaction between first resource manager 115, second resource manager 125 and second transaction manager 145. A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants. In one embodiment, first transaction manager 120 is configured to initiate a two-phase commit distributed transaction if there are multiple resource managers and/or transaction managers that will participate in the transaction.

In another embodiment, first transaction manager 120 may act as an intermediate coordinator node, and coordinate a distributed transaction between only first resource manager 115 and second resource manager 125. An intermediate coordinator node is a transaction manager that acts on behalf of a process that participates in a distributed transaction to coordinate local resource managers and/or additional transaction managers that are participants in the distributed transaction. An intermediate coordinator node gathers information about the participants that it manages, and reports the information to a master coordinator node. An intermediate coordinator node also receives commit or abort decisions from a master coordinator node, and propagates the decisions to participants that it manages.

In one embodiment, first server 105 is connected with a first data store 122. First data store 122 may include a file system, a database, or other data storage arrangement. In one embodiment, first data store 122 is internal to first server 105. Alternatively, first data store 122 may be external to first server 105, and connected with first server 105 either directly or via a network.

In one embodiment, first transaction manager 120 maintains a first log 130 of active transactions in the first data store 122. In a further embodiment, the first transaction manager 120 operates using the presumed abort optimization. Therefore, first transaction manager 120 writes to the first log 130 when it determines that all participants (e.g., resource managers and transaction managers) can commit to the transaction. Alternatively, first transaction manager 120 may operate using the presumed commit optimization or the presumed nothing optimization.

In one embodiment, first transaction manager 130 maintains an entry in the first log 130 for each participant of a specified transaction. As the first transaction manager 120 receives confirmation from participants that they successfully committed to the transaction, it may remove the entry corresponding to that participant from the first log 130. Once the first transaction manager 120 receives messages from all participants indicating that they have successfully completed the transaction, first transaction manager 120 deletes the log corresponding to that transaction. This minimizes the amount of storage capacity of first data store 122 that is required to maintain the first log 130.

First transaction manager 130 maintains a probabilistic data structure 160 in a data store. The probabilistic data structure 160 may be maintained on the same data store as the first log 130 (e.g., first data store 122), or may be maintained on a separate data store. The probabilistic data structure 160 may be checked by transaction manger 120 to determine whether a specified transaction was successfully completed. Such checks may be made, for example, when a resource manager 115 requests the outcome of a transaction (e.g., after a resource manager recovers from a crash or other failure).

In one embodiment, in which the presumed abort optimization is used, probabilistic data structure 160 is a record of successfully completed transactions. First transaction manager 120 may add an entry for a completed transaction to probabilistic data structure 160 once the first transaction manager 120 receives messages from all participants indicating that they have successfully completed the transaction, or when first transaction manager 120 determines that all participants can commit to the transaction. If an entry for a specified transaction is not present in probabilistic data structure 160, it can be determined to 100% accuracy that the specified transaction was not successfully completed (e.g., rolled back). If an entry for a specified transaction is found in such a probabilistic data structure 160, it can be determined to less than 100% accuracy that the specified transaction was successfully completed.

In another embodiment, in which the presumed commit optimization is used, probabilistic data structure 160 is a record of rolled-back transactions. First transaction manager 120 may add an entry for a rolled-back transaction to probabilistic data structure 160 once the first transaction manager 120 receives a message from a participant indicating that it cannot complete the transaction, or when first transaction manager 120 determines that the transaction should be rolled back. If an entry for a specified transaction is not found in such a probabilistic data structure 160, it can be determined to 100% accuracy that the specified transaction was successfully committed. If an entry for a specified transaction is found in such a probabilistic data structure 160, it can be determined to less than 100% accuracy that the specified transaction was rolled back.

In still another embodiment, in which the presumed nothing optimization is used, two separate probabilistic data structures are maintained. A first probabilistic data structure records entries of successfully completed transactions, and a second probabilistic data structure records entries of rolled back transactions. The first probabilistic data structure can respond with 100% accuracy that transactions were rolled back, and the second probabilistic data structure can respond with 100% accuracy that transactions were successfully completed. Alternatively just one of the first or second probabilistic data structures may be used with the presumed nothing optimization.

In one embodiment the probabilistic data structure 160 is a bloom filter. Alternatively, the probabilistic data structure may include a probabilistic hash table such as a hash table using cuckoo hashing, bitstate hashing and/or hash compaction.

A bloom filter is a space-efficient randomized data structure for representing a set in order to support membership queries. A bloom filter represents a set $A=[a_1, a_2, \ldots, a_n]$ of n elements (called keys). The bloom filter for representing the set A is described by an array of m bits, initially all set to 0. The bloom filter uses k independent hash functions $h_1, \ldots, h_k$ with range $[1, \ldots, m]$. For each element $a \in A$, the bits at positions $h_1(a), h_2(a), \ldots, h_k(a)$ in a vector of m bits are set to 1. Given a query for b we check the bits at positions $h_1(b), h_2(b), \ldots, h_k(b)$. If any of them is set to 0, then it is guaranteed that b is not in the set A. Otherwise it can be conjectured that b is in the set.

Depending on the size of the bloom filter and the number of entries, there is a certain chance for a false positive (a determination that b is in the set when it is not). The parameters of k and m should be chosen such that the probability of a false positive is acceptable. In bloom filters there is a tradeoff between m and the probability of a false positive. The probability of a false positive can be approximated to:

$$P=(1-e^{kn/m})k \qquad (1)$$

For example, a bloom filter having 100 bits (m=100), 5 hash functions (k=5) and 10 recorded entries (n=10) has a false positive probability of approximately 0.005. In embodiments of the present invention, bloom filters can be used that have an accuracy of 99.999% at approximately a tenth of the size of a standard hash table.

Probabilistic data structures (e.g., bloom filters) offer significant advantages over standard data structures such as hash tables. Probabilistic data structures are faster to read from, faster to write to, and require less storage capacity than standard data structures. However, probabilistic data structures are not 100% accurate. For example, bloom filters have a chance of false positives (as described above). Therefore, in one embodiment, in addition to maintaining probabilistic data structure 160, first transaction manager 120 also maintains an auxiliary data structure 165.

Auxiliary data structure 165 may be maintained in the same data store as the probabilistic data structure 160 (e.g., in first data store 122) or in a separate data store. The auxiliary data structure 165 is a non-probabilistic data structure in which first transaction manager 120 records all committed and/or all rolled back transactions. The auxiliary data structure 165 may be, for example, a hash table, a linked list, a relational database, etc.

In one embodiment, if the probabilistic data structure is queried, and returns a positive answer (indicating that a queried member is included in the probabilistic data structure 160), the auxiliary data structure 165 is checked to verify. This guarantees that no false positives are returned. By first checking the probabilistic data structure 160, and only checking the auxiliary data structure 165 under some circumstances, responses can be returned very rapidly in most cases.

A resource manager (e.g., first resource manager 115, second resource manager 125 and third resource manager 140) is a software module that manages a persistent and stable storage system. Examples of resource managers include databases and file managers.

In one embodiment, first server 105 is coupled with a second data store 132 and third data store 142. Alternatively, first data store 122, second data store 132 and/or third data store 142 may be components of a single data store. Second data store 132 and third data store 142 may include a file system, a database, or other data storage arrangement. In one embodiment, second data store 132 and third data store 142 are internal to first server 105. Alternatively, one or both of second data store 132 and third data store 142 may be external to first server 105, and connected with first server 105 either directly or via a network. In one embodiment, first resource manager 115 maintains a second log 134 on second data store 132 and second resource manager 125 maintains a third log 135 on third data store 142. Alternatively, the second log 134 and third log 135 may be maintained the same data store. The second and third logs 134, 135 may be undo logs (log of committed changes that occur during a distributed transaction) and/or redo logs (log of uncommitted changes that occur during a distributed transaction). The redo logs and/or undo logs can be used to rollback any changes that occurred during a distributed transaction if the transaction is aborted.

Each resource manager that participates in a distributed transaction may be a participant node of the transaction. During a prepare phase of a two-phase commit distributed transaction, a participant node is asked whether it can commit to the transaction by a coordinator node (e.g., an intermediate coordinator node or a master coordinator node). If the resource manager can commit to the transaction, it sends a commit response to the coordinator node. If the resource manager cannot commit to the transaction, it sends an abort message to the coordinator node.

During a commit phase of a two-phase commit distributed transaction, each resource manager receives a commit command if all resource managers indicated that they were able to commit. Each resource manager then commits to the transaction and sends an affirmation to the coordinator that the transaction was successfully completed. If one or more of the participating resource managers sent an abort response, then all resource managers receive an abort command during the commit phase. Each resource manager then rolls back the transaction, and may send an affirmation to the coordinator that the transaction was rolled back.

Occasionally, the first resource manager 115 and/or second resource manager 125 may crash (stop operating) after sending a commit affirmation for a distributed transaction to a coordinator node (e.g., first transaction manager 120) but before actually committing to the transaction. When, for example, the first resource manager 115 recovers from the crash, it may check the second log 134 to determine that there is an unresolved transaction. The second log 134 may identify the first transaction manager 120 as the coordinator for the transaction. First resource manager 115 may query first transaction manager 120 to determine what the outcome of the distributed transaction was. First transaction manager 120 may then check for an entry of the distributed transaction in the probabilistic data structure 160 and/or the auxiliary data structure 165 to determine the outcome. This outcome may then be sent back to the first resource manager 115. If the outcome was commit, the first resource manager 115 may then commit to the transaction. If the outcome was roll back, then the first resource manager 115 may use the contents of the second log 134 to roll back the transaction.

In one embodiment, the second server 110 includes a second transaction manager 145 and a third resource manager 140. The second transaction manager 145 may coordinate the third resource manager 140 and/or the first transaction manager 120 during distributed transactions. For example, if the second transaction manager 145 initiates a distributed transaction, it may send a commit query to the third resource manager 140 and to the first transaction manager 120. In one embodiment, second transaction manager 145 is combined with third resource manager 140 into a single module. Accordingly, third resource manager 140 may act as both a resource manager and a transaction manager (e.g., may coordinate transactions and/or participate in transactions). The third resource manager 140 may be coupled with a second data store 128, on which it may maintain a third log 150.

Figure 2A:
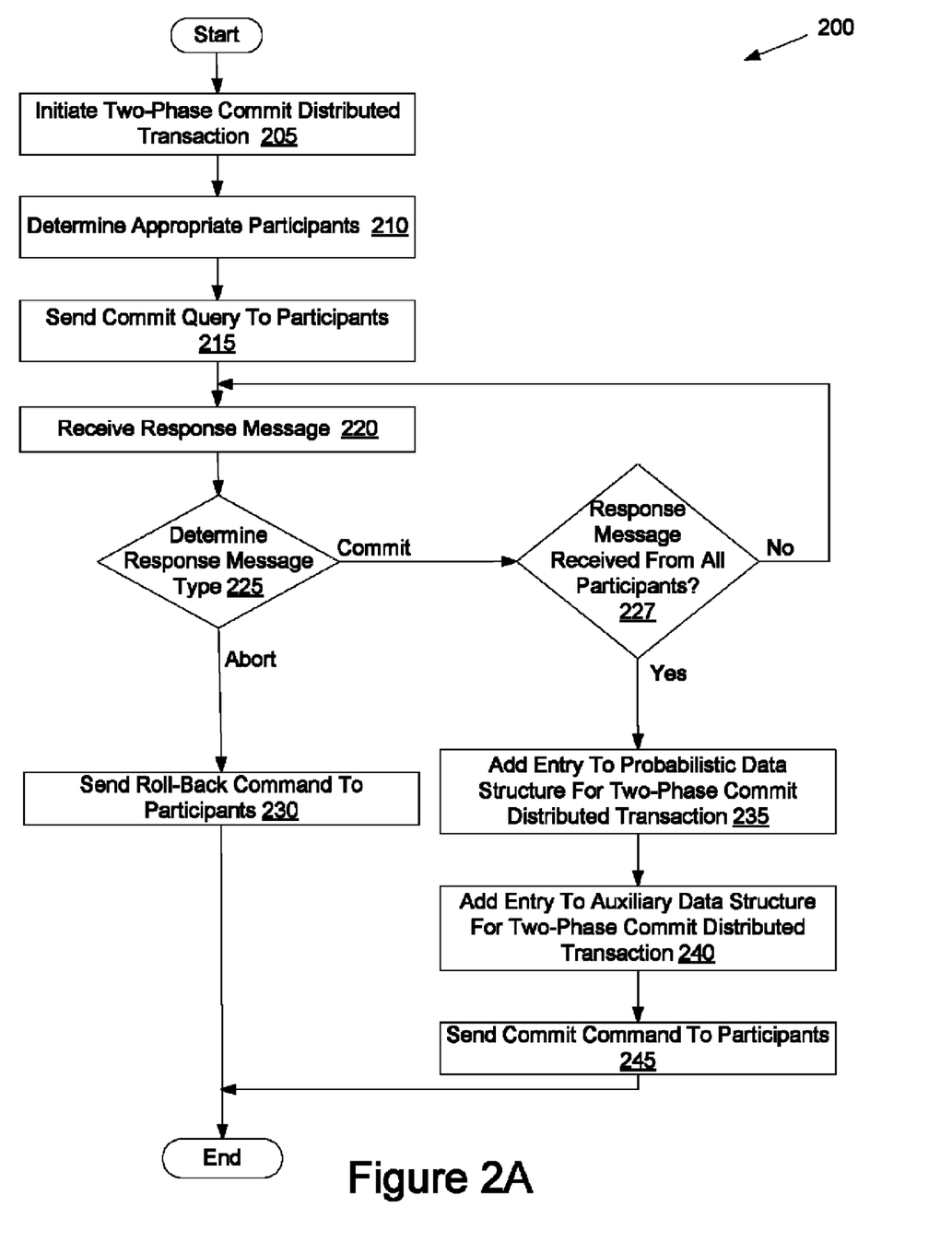
FIG. 2A illustrates a flow diagram of one embodiment for a method of coordinating a two-phase commit distributed transaction.

FIG. 2A illustrates a flow diagram of one embodiment for a method 200 of coordinating a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 200 is performed by a transaction manager (e.g., first transaction manager 120) of FIG. 1. In one embodiment, the two phase commit distributed transaction of method 200 is implemented using the presumed abort optimization. In another embodiment, the two phase commit distributed transaction of method 200 is implemented using the presumed nothing optimization.

Referring to FIG. 2A, method 200 includes initiating a two-phase commit distributed transaction (block 205). At block 210, appropriate participants for the distributed transaction are determined. Appropriate participants include resource managers that will contribute data or services to the transaction and/or transaction managers that manage those resource managers. Appropriate participants may be determined by broadcasting a transaction participation query, and receiving responses from all nodes that will participate in the queried transaction. Alternatively, appropriate participants may be determined, for example, based on a nature of the transaction, an initiator of the transaction, or other criteria. At block 215, a commit query is sent to each of the determined participants.

At block 220, a response message is received from a participant. At block 225, processing logic determines whether the response message is a commit response or an abort response. If the response message is a commit message, the method proceeds to block 227. If the response message is an abort message, the method proceeds to block 230.

At block 227, processing logic determines whether response have been received from all participants. If responses have not been received from all participants, the method returns to block 220. If responses have been received from all participants, the method proceeds to block 235.

At block 235, an entry is added to a probabilistic data structure (e.g., a bloom filter) for the two-phase commit distributed transaction. The entry indicates that the two-phase commit distributed transaction was successfully completed. At block 240, an entry is added to an auxiliary data structure for the distributed transaction. The auxiliary data structure may be maintained on a data store that is the same as or different from a data store on which the probabilistic data structure is maintained. The probabilistic data structure and/or the auxiliary data structure may be used in the future to determine whether the transaction was successfully committed or rolled back. At block 245, a commit command is sent to the participants of the distributed transaction.

At block 230, a roll-back command is sent to the participants of the distributed transaction. The method then ends.

Figure 2B:
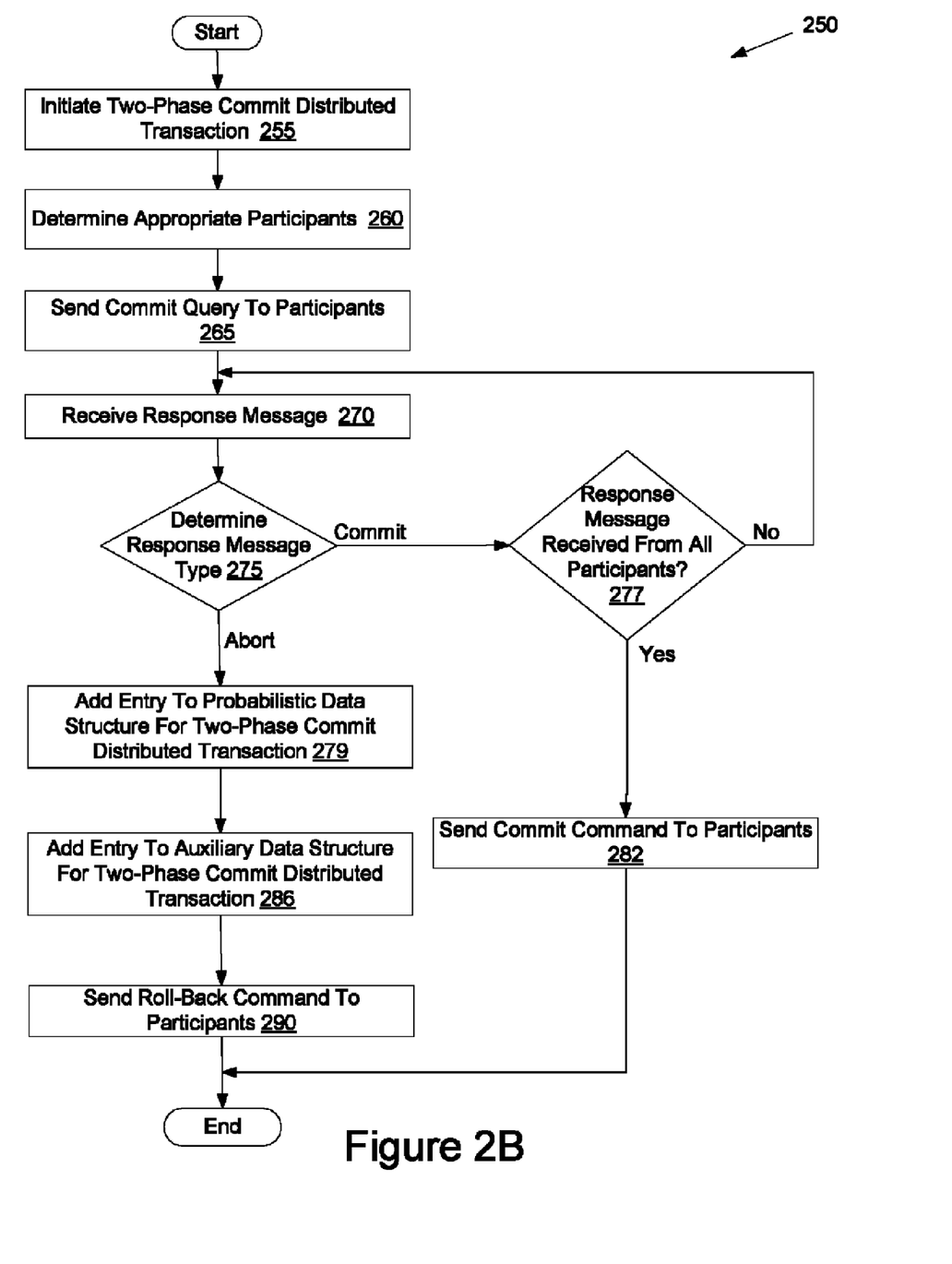
FIG. 2B illustrates a flow diagram of another embodiment for a method of coordinating a two-phase commit distributed transaction.

FIG. 2B illustrates a flow diagram of another embodiment for a method 250 of coordinating a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 250 is performed by a transaction manager (e.g., first transaction manager 120) of FIG. 1. In one embodiment, the two-phase commit distributed transaction of method 250 is implemented using the presumed commit optimization. In another embodiment, the two-phase commit distributed transaction of method 250 is implemented using the presumed nothing optimization.

Referring to FIG. 2B, method 250 includes initiating a two-phase commit distributed transaction (block 255). At block 260, appropriate participants for the distributed transaction are determined. Appropriate participants include resource managers that will contribute data or services to the transaction. At block 265, a commit query is sent to each of the determined participants.

At block 270, a response message is received from a participant. At block 275, processing logic determines whether the response message is a commit response or an abort response. If the response message is a commit response the method proceeds to block 277. If the response message is an abort message the method proceeds to block 279.

At block 277, processing logic determines whether responses have been received from all participants. If responses have not been received from all participants, the method returns to block 270. If responses have been received from all participants, the method proceeds to block 282, and a commit response is sent to the participants of the distributed transaction.

At block 279, an entry is added to a probabilistic data structure (e.g., a bloom filter) for the two-phase commit distributed transaction. The entry indicates that the two-phase commit distributed transaction was aborted (rolled back). At block 286, an entry is added to an auxiliary data structure for the distributed transaction. The auxiliary data structure may be maintained on a data store that is the same as or different from a data store on which the probabilistic data structure is maintained. At block 290, a roll-back command is sent to the participants of the distributed transaction. Subsequently, the probabilistic data structure and/or the auxiliary data structure may be accessed to determine whether the transaction was successfully committed or rolled back.

Figure 3:
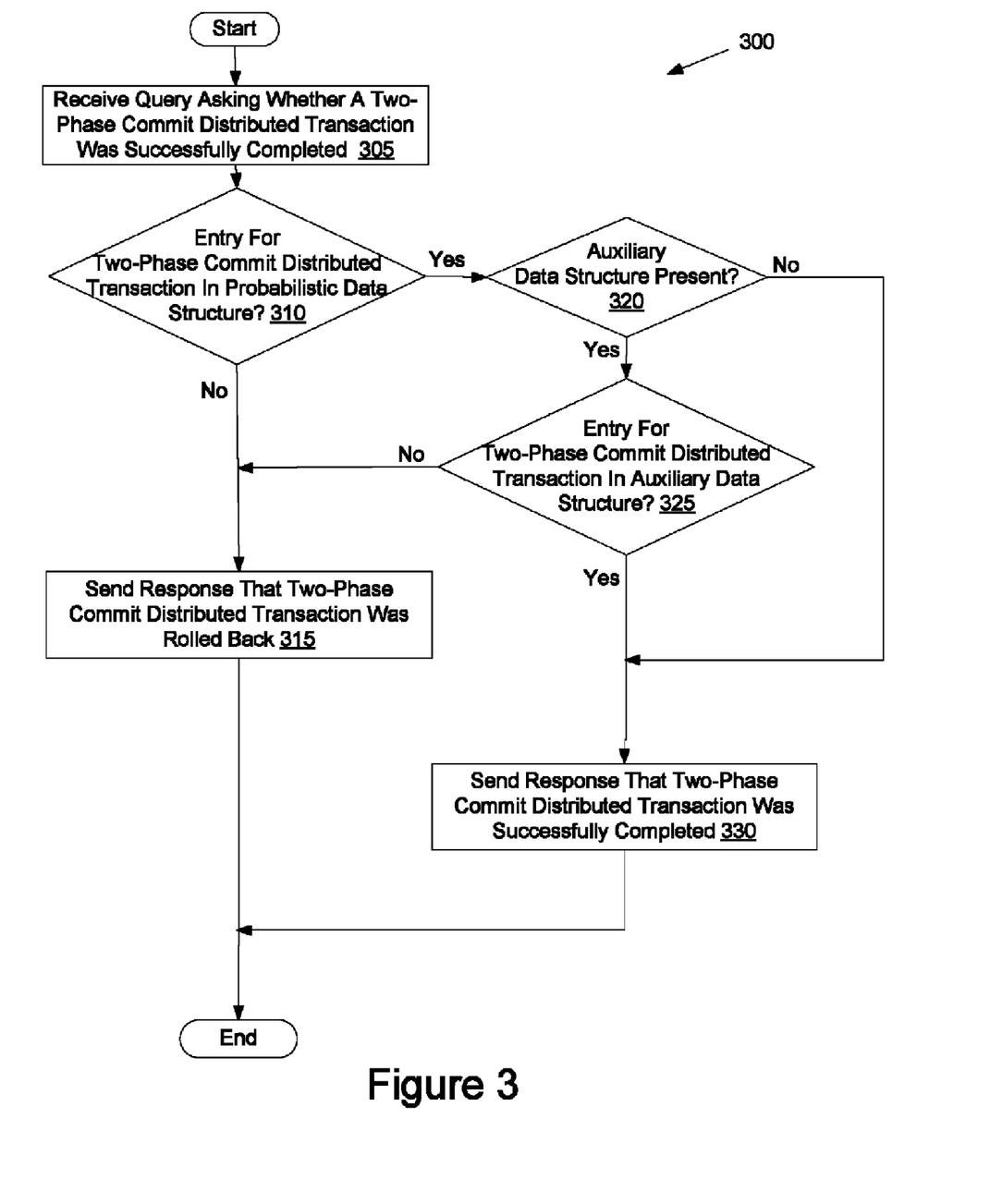
FIG. 3 illustrates a flow diagram of one embodiment for a method of determining whether a two-phase commit distributed transaction was successfully completed.

FIG. 3 illustrates a flow diagram of one embodiment for a method 300 of determining whether a two-phase commit distributed transaction was successfully completed. The method is performed by processing logic that comprises hardware (e.g., circuitry, dedicated logic, programmable logic, microcode, etc.), software (such as instructions run on a processing device), or a combination thereof. In one embodiment, method 300 is performed by a transaction manager (e.g., first transaction manager 120) of FIG. 1. In one embodiment, method 300 is invoked by the transaction manager subsequent to method 200 of FIG. 2A.

Referring to FIG. 3, method 300 includes receiving a query asking whether a two-phase commit distributed transaction was successfully completed (block 305). The query may be received by a transaction manager from a participant (e.g., resource manager) of a distributed transaction previously coordinated by the transaction manager. Alternatively, the query may be received from a client (e.g., a client that caused the distributed transaction to be initiated).

At block 310, processing logic determines whether an entry for the two-phase commit distributed transaction is included in a probabilistic data structure. If an entry for the distributed transaction is not in the probabilistic data structure, then it is known to 100% accuracy that the distributed transaction was rolled back. If an entry for the distributed transaction is in the probabilistic data structure, it is known to less than 100% accuracy that the distributed transaction was successfully completed. If an entry for the two-phase commit distributed transaction is not in the probabilistic data structure, the method proceeds to block 315. If an entry for the two-phase commit distributed transaction is in the probabilistic data structure, the method proceeds to block 320.

At block 320, processing logic determines whether an auxiliary data structure is present (e.g., maintained by a transaction manager). If an auxiliary data structure is present, the method proceeds to block 325. If no auxiliary data structure is present, the method proceeds to block 330.

At block 325, processing logic determines whether an entry for the two-phase commit distributed transaction is included in the auxiliary data structure. The auxiliary data structure is 100% accurate for both positive results and negative results. Therefore, the auxiliary data structure may be examined after examining the probabilistic data structure to eliminate the chance of a false positive. If an entry indicating that the distributed transaction was successfully completed exists in the auxiliary data structure, the method proceeds to block 330. If no such entry exists, the method proceeds to block 315.

At block 315, a response is generated indicating that the distributed transaction was rolled back. The response is then sent to a participant that initially made the query.

At block 330, a response is generated indicating that the distributed transaction was successfully completed. This response is 100% accurate if the result is based on an examination of the auxiliary data structure. However, the response may not be 100% accurate if only the probabilistic data structure was examined. The response is then sent to a participant that initially made the query. The method then ends.

Method 300 has been described with reference to a probabilistic data structure and an auxiliary data structure that store entries for successfully committed transactions. However, it should be understood that method 300 may also apply to probabilistic data structures and/or auxiliary data structures that store entries for aborted (rolled back) distributed transactions. For example, at block 305, processing logic may receive a query as to whether a distributed transaction was rolled back, at block 310, processing logic may determine whether an entry in the probabilistic data structure indicates that the distributed transaction was rolled back, and so on.

Figure 4:
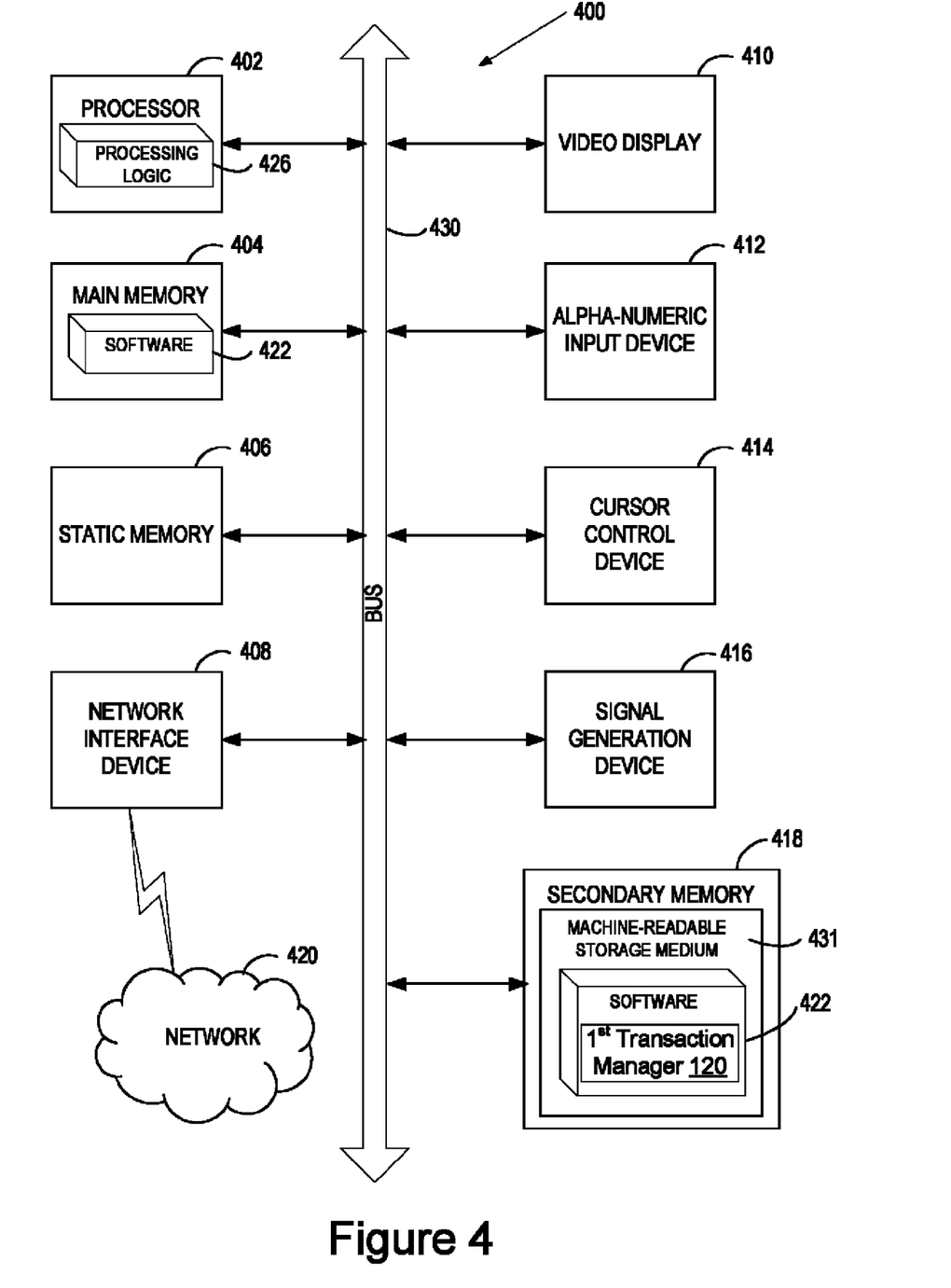
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store a transaction manager (e.g., first transaction manager 120 of FIG. 1A), probabilistic data structure, auxiliary data structure, and/or a software library containing methods that call transaction managers, probabilistic data structures and/or auxiliary data structures. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
   managing a two-phase commit distributed transaction by a transaction manager that is configured to use a presumed abort optimization;
   adding, by a processing device executing the transaction manager, an entry to a probabilistic data structure for the two-phase commit distributed transaction to record whether participants of the transaction have been directed to commit to the transaction, the entry indicating that the transaction was successfully completed;
   receiving a query from a participant of the two-phase commit distributed transaction asking whether the two-phase commit distributed transaction was successfully completed;
   directing the participant of the two-phase commit distributed transaction to commit to the transaction or to roll back the transaction based on contents of the probabilistic data structure, the directing comprising:
      responsive to determining that the entry for the two-phase commit distributed transaction is not in the probabilistic data structure, answering the query with a response that the transaction was aborted; and
      responsive to determining that the entry for the two-phase commit distributed transaction is in the probabilistic data structure, answering the query with a response that the transaction was likely successfully completed.

2. The method of claim 1, further comprising:
   using an auxiliary data structure to record whether the two-phase commit distributed transaction is successfully completed; and
   responsive to determining that an entry for the two-phase commit distributed transaction is in the probabilistic data structure, verifying whether the transaction was successfully completed by checking the auxiliary data structure.

3. The method of claim 1, wherein the probabilistic data structure is a bloom filter.

4. A computer readable storage medium including instructions that, when executed by a processing device, cause the processing device to perform a method comprising:
   managing a two-phase commit distributed transaction by a transaction manager running on the processing device, wherein the transaction manager is configured to use a presumed abort optimization;
   adding, by the transaction manager, an entry to a probabilistic data structure for the two-phase commit distributed transaction to record whether participants of the transaction have been directed to commit to the transaction, the entry indicating that the transaction was;
   receiving a query asking whether the two-phase commit distributed transaction was successfully completed;
   in response to determining that the entry for the two-phase commit distributed transaction is in the probabilistic data structure, answering the query with a response that the transaction was likely successfully completed; and
   in response to determining that no entry for the two-phase commit distributed transaction is in the probabilistic data structure, answering the query with a response that the transaction was aborted.

5. The computer readable storage medium of claim 4, the method further comprising:
   using an auxiliary data structure to record whether the two-phase commit distributed transaction as successfully completed; and
   responsive to determining that an entry for the two-phase commit distributed transaction is in the probabilistic data structure, verifying whether the transaction was successfully completed by checking the auxiliary data structure.

6. The computer readable storage medium of claim 4, wherein the probabilistic data structure is a bloom filter.

7. An apparatus comprising:
   a memory; and
   a processing device, coupled to the memory, to execute instructions for a transaction manager from the memory, wherein the processing device is configured by the instructions to:
      manage a two-phase commit distributed transaction between a plurality of participants using a presumed abort optimization;
      add an entry to a probabilistic data structure for the two-phase commit distributed transaction to record whether the plurality of participants of the transaction have been directed to commit to the transaction, the entry indicating that the transaction was successfully completed;
      receive a query asking whether the two-phase commit distributed transaction was successfully completed;
      answer the query with a response that the transaction was likely successfully completed responsive to determining that the entry for the two-phase commit distributed transaction is in the probabilistic data structure; and
      answer the query with a response that the transaction was aborted responsive to determining that the entry for the two-phase commit distributed transaction is not in the probabilistic data structure.

8. The apparatus of claim 7, wherein the processor is further configured to:
   record in an auxiliary data structure whether the two-phase commit distributed transaction as successfully completed; and
   use the auxiliary data structure to verify whether the transaction was successfully completed upon determining that an entry for the two-phase commit distributed transaction is in the probabilistic data structure.

9. The apparatus of claim 7, wherein the probabilistic data structure is a bloom filter.

10. A method, the method comprising:
    coordinating, by a processing device executing a transaction manager configured to use a presumed abort optimization, a two-phase commit distributed transaction, the coordinating comprising:

querying participants in the transaction as to whether they are able to commit to the transaction;

directing the participants to commit to the transaction when all of the participants indicated that they are able to commit; and     directing the participants to roll-back the transaction when not all of the participants indicated that they are able to commit;

adding, by the processing device, an entry to a probabilistic data structure for the transaction responsive to determining that the participants have been directed to commit to the transaction, the entry indicating that the transaction has successfully completed;

receiving a query asking whether the two-phase commit distributed transaction was successfully completed;

in response to determining that the entry for the two-phase commit distributed transaction is in the probabilistic data structure, answering the query with a response that the transaction was likely successfully completed; and in response to determining that the entry for the two-phase commit distributed transaction is not in the probabilistic data structure, answering the query with a response that the transaction was aborted.

11. The method of claim 10, further comprising:

using an auxiliary data structure to record whether the two-phase commit distributed transaction is successfully completed; and upon determining that an entry for the two-phase commit distributed transaction is in the probabilistic data structure, verifying whether the transaction was successfully completed by checking the auxiliary data structure.

12. The method of claim 10, wherein the probabilistic data structure is a bloom filter.

* * * * *